March 4, 1969   M. DELLA GALA   3,430,363
DEVICE FOR TEACHING ARITHMETIC AND PARTICULARLY
THE DECIMAL NUMBER SYSTEM
Filed April 4, 1967
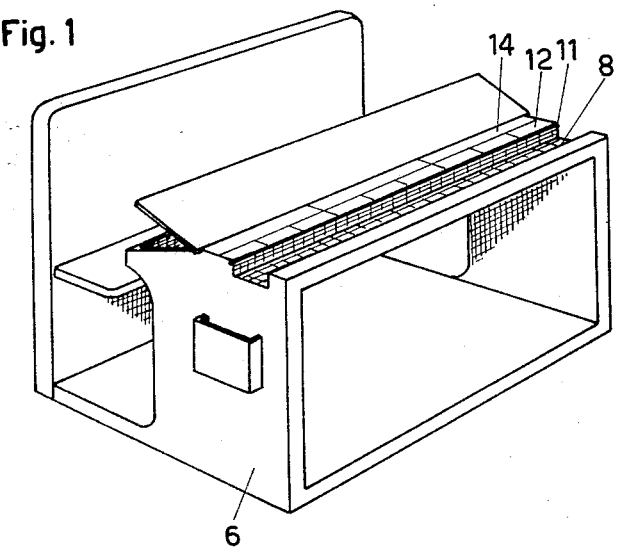
Fig. 1
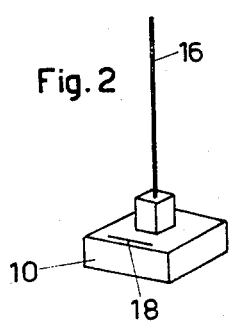
Fig. 2
Fig. 3
Fig. 4
Fig. 3bis
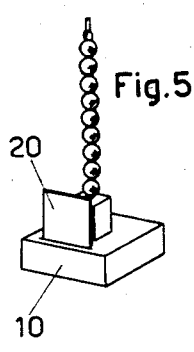
Fig. 5
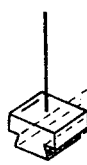
Fig. 6
Fig. 7
Maria Della Gala, INVENTOR.
BY Richards & Geier
ATTORNEYS

United States Patent Office 3,430,363
Patented Mar. 4, 1969

3,430,363
DEVICE FOR TEACHING ARITHMETIC AND PARTICULARLY THE DECIMAL NUMBER SYSTEM
Maria Della Gala, Via Filippo Ermini 2, Rome, Italy
Filed Apr. 4, 1967, Ser. No. 628,463
U.S. Cl. 35—31       2 Claims
Int. Cl. G09b 19/02; A47b 19/10

ABSTRACT OF THE DISCLOSURE

The device comprises a groove and a plurality of rods with a base slidable along the groove which rods support a stack of objects the number of which is written on a tag that is inserted into a slit of the base of each rod said number being expressed in units, in tens or in multiples of ten. Nine objects can be carried by a sleeve which fits said rod and the sleeves can be joined to one another to form a column of several sleeves.

---

The difficulties are well known of teaching arithmetic to children of the first classes of the elementary schools. Arithmetic is made up of concepts which, like the links of a long chain, succeed one to the other without interruptions, every concept presupposing another one and postulating a third one.

Hence the need of exciting an emotional interest of the pupils so that their attention be awakened and engaged and take part into everything that appears in front of them in the modern "active" school.

The teacher is particularly charged with this duty; however, as any other workman he is in need of tools to assist himself, that is of didactic aids. In spite of the general trend to modern teaching methods and while for the rest of the branches of instruction several and good didactic aids have been found, just arithmetic which is an abstract science and a notoriously difficult one, is still lacking a proper didactical aid. And this is strongly needed because arithmetic to be accepted must be absolutely understood.

In the first classes of the present day schools still exist the trite ball-frame with ten horizontal bars closed at their ends, by means of which it can be explained only that ten units make up a ten and vice-versa and that ten tens make up a hundred and vice-versa. And this is very little if compared with the manifold explanations which are required for arithmetic.

These requirements can be met by means of the present invention inasmuch as all the arithmetic concepts both basic and dependent can be materialized by it, wherefore arithmetic is made visible, tangible, concrete.

The main feature of the present invention consists of vertical columns which can be displaced along the same horizontal line and on pierced balls, cubes, disks or similar objects which can be threaded on said columns from the top thereof to represent the progression of numbers, whereby all the study of arithmetic can be carried out.

By the present invention the twofold result is achieved of taking advantage of both of the vertical and of the horizontal axes and this is achieved by means of a device which comprises movable columns which can be arranged in a track or made to slide along a common groove. Such a device will be displayed on a special form.

This invention will be more readily understood from the following description and attached drawings of a preferred embodiment thereof which is presented as a non-limitative example. In the drawings:

FIG. 1 is a perspective view of a school form with the groove of this invention and the related partitioned labels for the units, the tens, the hundreds, etc.

FIG. 2 is an axonometric view of a column supporting base, that is the cubic pedestal which is made to slide along the groove;

FIGS. 3, 3bis and 4 are section and perspective views of the sleeve to fit the rod of a column; said sleeve having balls threaded on it in FIG. 4 and disks on FIGS. 3 and 3bis;

FIG. 5 is an axonometric views of a column supporting base adapted for sliding along the groove of FIG. 1;

FIGS. 6 and 7 are a diagram of the device of this invention according to different embodimets, with different shapes of slides for the column base.

With reference to the figures, form or desk 6 carries on the upper surface thereof a groove 8 with rectangular, or square or dovetail cross section, the height of which is equal to the height of the column base 10. Along one of the top edges of groove 8 a first series of nine labels 12 is arranged with the words "units," "tens," "hundreds" from right to left.

In a row parallel to the former there is a second series of three labels 14 each of which extends for the length of three of the first series of labels. The three labels of the second series carry from right to left the words "simple," "of thousands" "of millions." Both the labels of the first series 12 and of the second series 14 are attached to a board which can be overturned to cover the groove 8. This can be achieved by means of a hinge 11 about which said board is swingable. In this manner, the form 6 can be readily transformed into a usual school form.

On base 10, on which rod 16 is mounted, there is provided a slit 18 for inserting a tag 20 each of said tags carrying a figure from 0 to 9. A support is placed on the upper side of the base which is large enough to prevent the sleeves from reaching the top surface of the base when fitted on the rod and thereby becoming hidden behind the tag.

Usually every column base 10 is inserted into the groove from right and after accomplishing the arithmetic operations for which it is intended it is pushed leftwards along the groove.

When the first base 10 is first inserted into the groove 8 from right, it will correspond to the word "units" of the first series of labels and the pupil will start his study by inserting on the rod 16 some balls or disks or other pierced objects in a number from 1 to 9. At this point by adding a further object, a whole ten will be made and consequently the whole column is displaced leftwards to occupy the place in front of the label "tens" of the first series of labels. Then the pupil will insert a tag into the slit of the column base with the figure "1." Another column is inserted into the groove to replace the former one, with no objects thereon. A tag with the figure "0" fill be inserted into the base of this column to show that there are no units thereon.

The pupil in this way materially realizes why the figure 10 means "ten." If from the column of ten objects now in front of the "tens" tag one and just one object is removed, only 9 objects are left, that is 9 units and therefore the whole of the nine objects must be returned to their place in front of the tag "units."

In order to make it easier to transfer more than one object from one column to another, a sleeve is provided which fits on the rod of the column and whose outer diameter is smaller than the hole through the objects (balls, cubes etc.). These are piled up on the sleeve and rest on a rim at the bottom thereof. The sleeve has a larger bore at the bottom and a rodlike projection at the top, which fits for a little distance into the bottom bore of another sleeve. In this way a sleeve containing a number of objects from 1 to 10 can be transferred as a whole from one column to another. So, when ten objects are again piled up on the column in front of the label "units" they are transferred as a whole unit on top of the column in front of label "tens," so that there are two tens on this column. The pupil then inserts the figure "2" into the slit at the base of the column "tens."

After the transfer of the second ten from the column "units" to the column "tens" no object is left on the column "units" and therefore the figure "0" can be inserted in the slit at the base of column "units."

When the pupil will be familiar with the arithmetic operations which imply a quantity of 20 units, he can proceed with larger numbers. However if up to now he has been using large objects such as balls or cubes, at this moment he must replace all his objects with thinner ones, because otherwise the objects to be heaped up on the second column will reach the number of 90 units and if each object is too high, the column height will be unacceptable; while if the height of each object is about 2–3 millimeters, the column height will be only 18–27 centimeters.

By adding successive tens of objects on top of the second column from right, this column will come to contain nine tens; at this moment, if another ten is to be added, the whole column will be pushed leftwards to occupy the place in front of the label "hundreds" and just then, the tenth ten will be added to form one hundred. When the column in front of label "units" as a consequence of other units being added thereto will reach again the number of nine objects, it will also be displaced leftwards and completed with another unit; another column will then be placed in the groove in front of label "units."

By proceeding in this way, the moment will arrive in which 999 objects are to be heaped as a total on the first three columns, this however would imply that the third column front right would contain nine hundred objects and this would be impractical if each object were more than 0.2–0.3 millimeters thick. As the use of such thin objects is not advisable the disks will be used up to a total number of 199, after which other kind of objects will be used such as small sticks, rods, straws, etc. and all objects previously used will be replaced with the new kind of objects.

The pupil will first make a bundle of, say, ten sticks and subsequently of ten bundles of ten sticks, that is of one hundred sticks and finally a bundle of ten bundles of ten bundles of ten sticks, that is a bundle of one thousand sticks. The bundles cannot obviously be heaped up as columns on the rods; they are simply placed on the top surface of the form in front of the rod, while a tag with the corresponding figure is inserted in the slit of the rod base.

When the pupil has become familiar with operations up to a total of one or two thousand objects, he will have clearly realized that every column cannot contain more than nine units of the same order and that the ratio of the objects on any column is constantly equal to ten. He will then be able to make operations without the aid of the objects; he will only use the tags at the base of the rods, which tags are movable and carry each a figure from 0 to 9.

By the device of the present invention the pupil will be in a condition to carry out all the operations of the multiplication table: multiplications as well as divisions. The device is also particularly suited for studying the metric system. To this purpose the labels 12 of the first row of labels in front of the columns will be replaced with similar labels with different multiples and submultiples of a unit of measure; for instance starting from right the labels will read millimeters, centimeters, decimeters, meters, decameters, hectometers, kilometers or the corresponding symbols.

In this manner, if the units of length are studied, when the tag with the figure "1" is placed on the base of the fourth rod which has always been the rod on the thousands, the pupil immediately realizes that one meter is equal to one thousand millimeters.

In order to make the device more complete and visually impressive, in addition to the rods for carrying the objects it includes also auxiliary rods with a base which fits into the groove of this invention.

The base of these rods is however much narrower than the main rods, so that they can be inserted between two of the latter rods without occupying too much space. The auxiliary rods are for carrying a small removable tag or disk on top of them, with arithmetic marks, that is a point or a comma. For instance, one auxiliary rod could be inserted after the first three columns of objects from right to indicate that the fourth column is the column of the thousands, and a second auxiliary rod could be placed after the sixth column to indicate the beginning of the millions.

According to a second embodiment, the device of this invention comprises a board which has a dovetail slide along which the bases of the rods already described can be displaced.

It is to be understood that the invention as herein disclosed may be varied from the details described and shown without departing from the spirit of the appended claims.

What I claim is:

1. A device for teaching arithmetic, said device comprising a groove, a plurality of main rods, each of said rods having a substantially prismatic base adapted to fit slidably in said groove, a plurality of pierced objects adapted to be strung on said rods one by one and in groups of several units, a plurality of sleeves, the inner diameter of each sleeve being somewhat larger than the diameter of said rods and the outer diameter of said sleeves being somewhat smaller than the diameter of the holes in said pierced objects, said sleeves having bores at the bottoms thereof and projections at the tops thereof which fit into said bottom bores, whereby a column can be formed with the pierced objects contained in a series of sleeves superimposed one upon the other, said rod base being provided with a slit for the insertion of a tag bearing a figure from 0 to 9, and a support on the upper surface of said base, said support being large enough to prevent a sleeve from reaching the top surface of the base when placed upon said rod and thus being hidden behind said tag, auxiliary rods, each of said auxiliary rods having a base similar to but substantially narrower than that of a main rod, and a plurality of tags having arithmetic marks thereon, said tags being removably mounted on top of said auxiliary rods, whereby arithmetic marks can be interposed between two of said main rods.

2. A device in accordance with claim 1, wherein said groove is integral with a school desk having a surface extending in front of the groove and alongside thereof, a first row of nine rectangular labels in three groups of three, the first label from the right side of each group containing the word "units," the second label containing the words "of tens" and the third label containing the words "of hundreds," and a second row of three rectangular labels each of which extends the length of three partitions of the first row, the first one of the last-mentioned labels containing the word "units," the second one containing the words "thousands" and the third one containing the word "millions."

References Cited

UNITED STATES PATENTS

| | | | |
|---|---|---|---|
| 39,740 | 9/1863 | Miller | 35—32 |
| 2,564,976 | 8/1951 | Hooper | 35—31 |

FOREIGN PATENTS 578,304   6/1958   Italy.

WILLIAM H. GRIEB, *Primary Examiner.*

U.S. Cl. X.R.

35—60